Dec. 9, 1924.                                                    1,518,424
O. HASERODT
FISHLINE FLOAT
Filed April 10, 1922
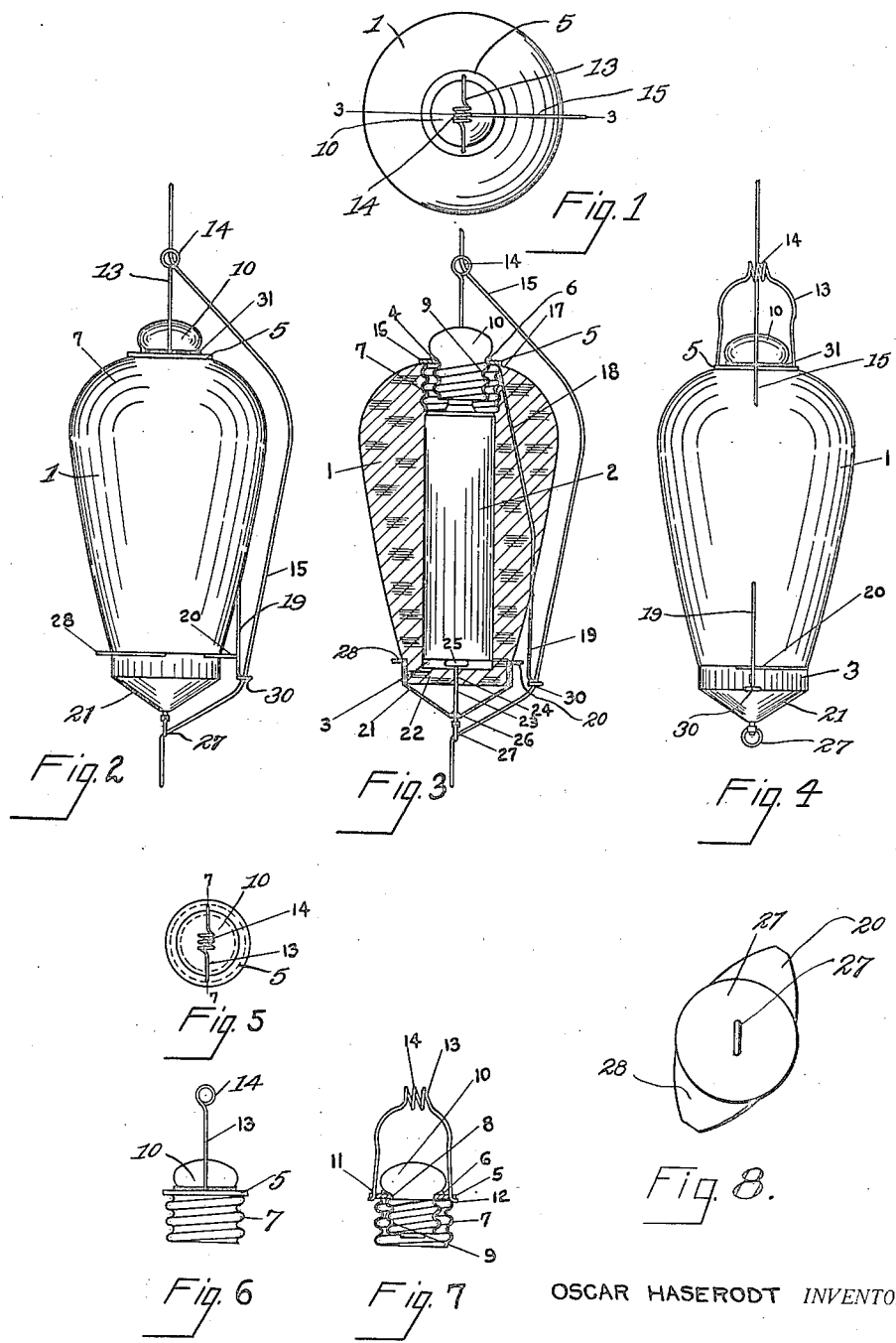
OSCAR HASERODT INVENTOR.
BY Richey, Slough & Hales
HIS ATTORNEYS Patented Dec. 9, 1924.

1,518,424

UNITED STATES PATENT OFFICE.

OSCAR HASERODT, OF ELYRIA, OHIO.

FISHLINE FLOAT.

Application filed April 10, 1922. Serial No. 550,987.

*To all whom it may concern:*

Be it known that I, OSCAR HASERODT, a citizen of the United States, residing at Elyria, in the county of Lorain and State of Ohio, have invented certain new and useful Improvements in Fishline Floats, of which the following is a full, clear, concise, and exact description, as will enable others skilled in the art to which my invention appertains to make and use the same.

My invention relates to fish line floats, and more particularly to a fish line float which may be advantageously employed for fishing purposes at night, and which is adapted for such a purpose by being provided with means for lighting an electric lamp carried on the float whenever the hook, attached to the end of the line secured to the float, is taken by a fish.

The invention of the present application is in the nature of an improvement in fish line floats of such types wherein the float is of such bouyancy as to maintain it on the surface of the water only when the hook on the end of the line attached to the float has not been taken by the fish, and which float may be pulled beneath the surface of the water, such pull, as by a fish, causing the operation of the signal lamp which is so disposed on the float that when illuminated even though the float be pulled below the surface of the water, the lamp may be clearly seen through the water notifying the fisherman that the time has come when he should retrieve his catch.

It is an object of the present invention to provide a fish line float wherein a cylindrical recess is provided adapted to receive a battery cell, said battery cell being insertable in the top of the float.

Another object of my invention is to provide a cap for the top opening of the said recess adapted to be put into place after the battery cell has been inserted within the body of the float.

Another object of my invention is to provide a signal lamp socket in the said cap whereby a signal lamp may be mounted in the cap and which may make electrical connection with the battery cell within the said recess when the cap containing the lamp is in its operative position on the float.

Another object of my invention is to provide a line supporting and engaging bridge element having a portion disposed above the float, and having a pair of downwardly extending arms secured to the said cap to act as a handle for the cap and to facilitate the insertion or removal of the cap from the said recessed opening.

Another object of my invention is to provide a structure wherein the above different objects are secured and in which a proper control may be had by the end of the fish line over the signal lamp, a battery circuit whereby, when the lower end of the line is pulled, as by a biting fish, electrical current from the battery cell will pass over a circuit closed by such a pull on the signal lamp to illuminate the same.

Other objects of my invention, and the invention itself will become apparent by reference to the following description, and in which description reference will be had to the drawing accompanying the same and which is a part of this specification.

Referring to the drawing:—

Fig. 1 shows a top plan view of an embodiment of my invention.

Fig. 2 shows a side elevational view thereof.

Fig. 3 shows a longitudinal medial sectional view of the embodiment illustrated in the foregoing figures.

Fig. 4 shows a side elevational view thereof.

Fig. 5 shows a top plan view of the recess opening cap cover, and associated parts.

Fig. 6 shows a side elevational view of the parts shown in Fig. 5.

Fig. 7 shows a vertical longitudinal sectional view of the parts shown in Figs. 5 and 6.

Fig. 8 is a bottom plan view of the float cap showing the form of the contacts employed.

Referring now to all of the figures in each of which like parts are indicated by like reference characters, at 1 I show a float body preferably of cork, although a hollow body of other material such as metallic material may be used where desired, and at 2 I show a battery cell carried in a recess 3 in the said float body, the said recess being substantially cylindrical and extending from near the lower portion of the float body to the upper end thereof whereat the said recess has a recess opening 4. The float body 1 is substantially of inverted pear shape, although it may be shaped otherwise, the lower portion thereof being of reduced horizontal diameter, and the upper portion being enlarged. The opening 4 is adapted to be plugged by a cap cover 5 comprising an upper wall 6 and a spirally corrugated side wall 7, there being a circular opening in the top wall 6 at the central portion thereof 8, and depending from the rim of the said opening I provide an inner spirally corrugated wall 9 of such shape and size as to act as a socket member for a miniature incandescent lamp 10 adapted to be screw threaded in the said socket. On opposite sides of the top wall 6 of the cover 5, I secure the ends 11 and 12 of a cap cover handle 13 having its upper intermediate portion 14 preferably coiled so as to facilitate the securing thereto of a fish line 15 as shown in Figs. 1 to 4 inclusive.

In practice when a battery cell 2 is to be inserted in the recess 3 of the float body, 1, the cap 4 is removed by taking hold of the handle 13 and perhaps rotating the said cap by the said handle until the cap is removed from the opening of the recess, and then, if an old battery cell 2 is in the float body, this is removed by upturning the float and a new cell inserted, the new cell taking position substantially as shown in Fig. 3 within the recess 3. The cap is then turned into place, its outer walls 7 engaging the inner walls of the cork float body 1 which are either likewise spirally grooved, or made of such a material as wood which is compressible, and the cap is turned down tightly into position until the outer flanged edge thereof comprising the periphery 16 of the top cap cover wall 6 makes engagement with the top wall 17 of the float body 1. During this time, a wire contact element 18 projecting through the float body from a lower outer portion 19 to the inside wall of the recess 3 at its upper opening portion makes contact with the cap element side wall 7, the contact being caused by pressure engagement of the spring wire member 18 so that an electrical connection is maintained through the top wall 6 of the cap element 4 between the lower spring wire portion 19, and the incandescent lamp socket 9 secured to the top wall 4. Likewise an electrical connection is maintained between adjustable contact pieces 20 and 28 secured on a cap 21 frictionally secured on the reduced end 22 of the float body by means of a stem 23 projecting through the float body at 24 and making electrical connection at 25 with the battery cell 2, the lower end of the stem 23 extending through and making electrical contact connection with the cap 21 at its lowermost central portion 26, the stem 23 terminating below the point 26 in a ring 27 which is preferably swiveled on the end of the stem 23.

The cap 21 has laterally outwardly extending flanges 20 and 28, either one of which is adapted to serve as adjustable contact pieces connecting with one of the poles of the battery 2 through the stem 23.

The arrangement for adjusting the contact pieces 20 and 28 closer to or away from the portion 19 of the flexible spring wire member 18 is as follows, it being understood that the contacts 20 and 28 as shown, particularly in Fig. 8, are cam shaped, that is, they extend further from the axis of the float body increasingly as the float is rotated in a given direction. When, therefore, the contact spring 19 is adjusted out of contact with an intermediate portion of such outer cam surface of the contacts 20 and 28 and the cap 21 rotated in the one direction, the spring 19 will engage that portion of the cam surface which is more distant from the float body axis and as such cam surface is rotated into contact with such spring, the contacts can be separated and the space between them regulated by such rotative action of the cap; the cap will be held in a given rotative position by the friction between it and the portion of the float body upon which it is carried.

In putting the float into service, the fish line 15 is secured to the cap handle 13 at its intermediate coiled portion 14, and then is passed through an opening 30 in the end of the flexible spring movable contact element 19, the walls of the opening 30 making frictional contact with the line 15, the line 15 then passing through the circular swiveling eyelet 27 journaled on the end of the stem 23; a certain amount of slack is left in the line between the portion 14 of the handle 13, and the portion 30 of the deflectable spring member 18.

In operation, the float is connected up on the line as above described, and otherwise as would be the practice with an ordinary small fish line float for individual line fishing, and put in the water, the end of the fish line carrying the hook being suitably weighted, and the spring 19 being of such stiffness that it will not be moved by the weight normally on the end of the line, including the hook and the bait, to make connection with the adjacent contact elements 20 or 28 which may be advanced by the rotation of the cap 21 adjacent the ends 19 of the spring 18.

The cap shaped outer edge of the stationary contact element is provided for the purpose of adjustment of the distance between the ends 19 of the spring and the stationary contact so as to enable the user to adjust the contacts for a heavier weight on the lower end of the line, and for different degrees of responsiveness to pulls of varying strength on the lower end of the line, a sufficient pull as determined by the adjustment operating to deflect the spring end 19 inwardly to make contact with the adjacent contact piece 20 or 28, and to complete a circuit including the said contact spring and piece, the battery cell, and the lamp. Thus the lamp will be illuminated and remain illuminated as long as the pull continues of sufficient strength, even though such pull results in pulling the lamp below the surface of the water and the lamp will shine through the water when below the surface.

The arrangement of the cap cover and carried lamp 10 in the top or opening portion of the recess 3 is such that a very tight connection may be had which may be effective to seal the recess against the ingress of moisture, and such sealing is further promoted by the provision of a rubber band 31 which is snapped over the lamp 10 and tightly engages the junction of the lamp 10 and the top wall 6 of the cover cap tightly sealing the seam of such junction.

Having thus described my invention in a specific embodiment, I am aware that numerous and extensive departures may be made from the embodiment herein illustrated and described, but without departing from the spirit of my invention which is defined by the appended claims:

1. In a fish line float, the combination with a float body having a longitudinally disposed recess extending partially therethrough, a battery cell within the recess in said body and removable therefrom; a cap member enclosing the open recessed end of said body, said cap comprising an outer cylindrical wall adapted to be secured to the inner wall of said float body, an apertured end wall, and an inner cylindrical lamp socket wall in alignment with the opening in said end wall, said outer and inner walls being attached to said end wall and extending within the recess in said body; an incandescent lamp adapted to be positioned in the said lamp socket through the opening in the wall of the cap and to have its bulb projecting above the said end wall whereby when illuminated the light will be visible from above and to the sides of said float body; and a set of electrical contacts adapted to be operated by a pull on the hook end of the line to cause a circuit between the said battery and the said lamp to illuminate the lamp.

2. In a fish line float, the combination of a float body having a longitudinally disposed recess extending partially therethrough, the inner wall of said body being threaded; a battery cell within the recess in said body and removable endwise therefrom; a cap member enclosing the open recessed end of said body, said member comprising an outer threaded substantially cylindrical wall adapted to be screwed into the inner threaded wall of said float body, an apertured end wall, and an inner threaded cylindrical lamp socket wall in alignment with the opening in said end walls, said outer and inner walls being attached to said end wall and extending within the recess in said body; an incandescent lamp adapted to be screwed in the said lamp socket wall through the opening in the end wall of the cap and to have its bulb projecting above the end wall whereby when illuminated the light will be visible from above and through the sides of said float body; and a set of electrical contacts adapted to be operated by a pull on the hook end of the line to close the circuit between the said battery and the said lamp to illuminate the lamp.

3. In a fish line float, the combination with a float body, said body having a longitudinally disposed recess, a recess opening in the top wall of the said body, a cap adapted to be secured to the said body, and to cover the said opening, a battery cell insertable in the said recess, said cap adapted to retain the said cell in position, said cap comprising a top wall, a substantially cylindrical side wall, an opening in the central part of the top wall, an electrical incandescent lamp receiving socket element carried by the said top wall and disposed within the said substantially cylindrical outer wall, and below the said top wall opening, an incandescent lamp adapted to be positioned in the said lamp, socket and to have its bulb projecting above the said socket whereby when illuminated the said lamp will be visible from above and to the sides of the said float body, and a set of electrical contacts adapted to be operated by a pull on the hook end of the line to close a circuit between the said battery and the said lamp to illuminate the lamp, said contact comprising a pair of contact elements, one of said elements being electrically connected to the said lamp socket, and a circuit conductor passing through a wall of the said float body adapted to connect a pole of the said battery cell to the other contact element, said other battery pole being connected to an electrode of the said lamp.

In witness whereof, I have hereunto signed my name this 7th day of April, 1922.

OSCAR HASERODT.